(12) United States Patent
Sakashita et al.

(10) Patent No.: US 11,965,286 B2
(45) Date of Patent: Apr. 23, 2024

(54) SYNTHETIC RESIN SKIN MATERIAL AND MANUFACTURING METHOD THEREOF

(71) Applicant: KYOWA LEATHER CLOTH CO., LTD., Hamamatsu (JP)

(72) Inventors: Tomohisa Sakashita, Hamamatsu (JP); Tomoyuki Ishiyama, Hamamatsu (JP); Mayu Ohba, Hamamatsu (JP); Kento Terai, Hamamatsu (JP); Akinaka Fukumi, Hamamatsu (JP)

(73) Assignee: KYOWA LEATHER CLOTH CO., LTD., Hamamatsu (JP)

( * ) Notice: Subject to any disclaimer, the term of this patent is extended or adjusted under 35 U.S.C. 154(b) by 196 days.

(21) Appl. No.: 17/442,767

(22) PCT Filed: May 28, 2020

(86) PCT No.: PCT/JP2020/021143
§ 371 (c)(1),
(2) Date: Sep. 24, 2021

(87) PCT Pub. No.: WO2020/246365
PCT Pub. Date: Dec. 10, 2020

(65) Prior Publication Data
US 2022/0186428 A1 Jun. 16, 2022

(30) Foreign Application Priority Data
Jun. 4, 2019 (JP) .................. 2019-104503

(51) Int. Cl.
*D06N 3/14* (2006.01)
*D06C 23/04* (2006.01)
*D06N 3/00* (2006.01)

(52) U.S. Cl.
CPC ............. *D06N 3/14* (2013.01); *D06N 3/0009* (2013.01); *D06N 3/0036* (2013.01);
(Continued)

(58) Field of Classification Search
CPC ...... D06N 3/14; D06N 3/0009; D06N 3/0036; D06N 3/0068; D06N 3/0077;
(Continued)

(56) References Cited

U.S. PATENT DOCUMENTS 5,670,237 A * 9/1997 Shultz ................... B29C 43/222
428/187
11,577,487 B2 * 2/2023 Ishiyama ................ B32B 27/36
(Continued)

FOREIGN PATENT DOCUMENTS

| JP | H02-61181 A | 3/1990 |
| JP | 2003-326598 A | 11/2003 |

(Continued)

OTHER PUBLICATIONS

Aug. 11, 2020 International Search Report issued in International Patent Application No. PCT/JP2020/021143.
(Continued)

*Primary Examiner* — Jennifer A Steele
(74) *Attorney, Agent, or Firm* — Oliff PLC

(57) ABSTRACT

A synthetic resin skin material and a manufacturing method thereof, the synthetic resin skin material including, in this order: a base fabric; a thermoplastic resin layer having a storage elastic modulus at 160° C. of 2,000,000 Pa or less measured in accordance with JIS K 7244 (1998); and a skin layer containing a urethane resin, wherein the synthetic resin skin material has recesses at a side of the skin layer, the recesses having a depth, in a thickness direction of the synthetic resin skin material, that extends from the skin layer as far as an inner part of the thermoplastic resin layer, past a boundary that is present between the skin layer and the thermoplastic resin layer at a non-recessed region.

9 Claims, 6 Drawing Sheets

(52) U.S. Cl.
CPC ......... *D06N 3/0068* (2013.01); *D06N 3/0077* (2013.01); *D06C 23/04* (2013.01); *D06N 2203/048* (2013.01); *D06N 2211/28* (2013.01)

(58) Field of Classification Search
CPC ......... D06N 2203/048; D06N 2211/28; D06N 3/144; D06N 3/0015; D06N 3/0034; D06N 3/0038; D06N 3/0059; D06N 3/08; D06N 2209/105; D06N 2211/263; D06C 23/04; B32B 27/12; B32B 27/304; B32B 27/40; B32B 37/00; B32B 38/00; Y10T 428/24537; Y10T 428/24636; Y10T 428/24702; Y10T 428/24727
See application file for complete search history.

(56) References Cited

U.S. PATENT DOCUMENTS

| | | | | |
|---|---|---|---|---|
| 2007/0031640 | A1* | 2/2007 | Tian | D06N 7/001 428/141 |
| 2007/0231546 | A1* | 10/2007 | Xia | B32B 7/12 428/151 |
| 2009/0186724 | A1* | 7/2009 | Ashida | A63B 45/00 473/607 |
| 2017/0001409 | A1* | 1/2017 | Feng | B32B 9/025 |
| 2020/0010659 | A1* | 1/2020 | Fujiwara | C08K 3/22 |

FOREIGN PATENT DOCUMENTS

| | | | | |
|---|---|---|---|---|
| JP | 2004-243583 | A | | 9/2004 |
| JP | 2015-066889 | A | | 4/2015 |
| JP | 2015066889 | A | * | 4/2015 |
| JP | 2017-196814 | A | | 11/2017 |
| KR | 20010011731 | A | * | 2/2001 ............... D06N 3/14 |
| WO | WO-9003744 | A1 | * | 4/1990 ............... A43B 9/02 |
| WO | WO-2011094930 | A1 | * | 8/2011 ........... B32B 27/08 |
| WO | WO-2015087522 | A1 | * | 6/2015 .......... B32B 27/065 |
| WO | 2017/006556 | A1 | | 1/2017 |
| WO | 2018/173858 | A1 | | 9/2018 |
| WO | WO-2018173858 | A1 | * | 9/2018 ........... B29C 41/003 |

OTHER PUBLICATIONS

Oct. 4, 2019 Request for Accelerated Examination issued in Japanese Patent Application No. 2019-104503.
Nov. 5, 2019 Office Action issued in Japanese Patent Application No. 2019-104503.

\* cited by examiner

SYNTHETIC RESIN SKIN MATERIAL AND MANUFACTURING METHOD THEREOF

TECHNICAL FIELD

The present disclosure relates to a synthetic resin skin material and a manufacturing method thereof.

BACKGROUND ART

In recent years, synthetic resin skin materials having excellent durability are being widely used in place of natural leather and fibrous sheets in automobile interior parts (instrument panels, door trims, seats, ceilings, and the like), railroad vehicle interior parts, aircraft interior parts (trims, seats, ceilings, and the like), furniture, footwear such as shoes, bags, interior/exterior parts for construction, clothing surface materials/lining, and wall covering materials. Such synthetic resin skin materials have a concave-convex pattern similar to that of natural leather on the outermost surface, that is, a grain pattern, and this grain pattern characterizes the appearance.

In recent years, as synthetic leather used for automobile seats, chairs and the like, there has been demand for three-dimensional skin materials having a deeper concave-convex pattern, as compared to the synthetic leather having a leather-like shallow concave-convex pattern that has been conventionally used.

For the foregoing reason, configurations in which a cloth (fabric) is used as a base material, a urethane foam layer for imparting cushioning properties is provided on the inner surface of the base material, and a skin layer for imparting designs is provided on the outer surface, are generally used.

As a method for manufacturing a skin material having a concave-convex pattern that can form a deep and clear concave-convex pattern and that can manufacture a skin material in which the shape of the concave-convex pattern does not undergo deformation even after long-term use, a method including layering a flexible polyurethane foam material having specific properties on a surface material having a constant load elongation of 2 to 50% to integrate the two and obtain a laminate sheet, and thereafter carrying out heat pressing by disposing, between a pair of upper and lower heating plates, the laminate sheet and a die having multiple protrusions at the pressing portion, has been proposed (see Patent Document 1), for example.

Also proposed is a composite material for embossing, the composite material having a skin material, and a first flexible polyurethane foam sheet and a second flexible polyurethane foam sheet layered on the back surface of the skin material in this order. It is described that this composite material is capable of achieving both cushioning properties and deep concave-convex design-formation properties (see Patent Document 2).

RELATED ART DOCUMENT

Patent Document

[Patent Document 1] Japanese Patent Application Laid-Open (JP-A) No. 2003-326598
[Patent Document 2] International Publication No. 2017/006556

SUMMARY OF INVENTION

Technical Problem

As a method for forming a three-dimensional shape having a favorable design, such as a concave-convex pattern of adequate depth, on a synthetic resin skin material, in the case of a synthetic resin skin material having a thermoplastic resin-containing layer, such as a urethane resin layer or a polyvinyl chloride resin layer, a method of applying the shape of an embossing dye to the synthetic resin skin material by heat and pressure, thereby retaining the concave-convex pattern thereon, is generally employed. However, in the case of a synthetic resin skin material having a dry urethane resin layer, there have been the problems that it is difficult to impart subtle designs or three-dimensional appearance by application of heat using an embossing machine, and that it is difficult to maintain the shapes that have been imparted, resulting in the shapes disappearing over time.

The inventions described in Patent Document 1 and Patent Document 2 may, depending on the material of the skin material, have difficulty in retaining the formed concave-convex shapes, or may require complex steps or result in an increased thickness of the skin material overall by requiring the use of a flexible urethane foam.

Therefore, the skin materials described in Patent Document 1 and Patent Document 2 are problematic in that there may be difficulties in applying the skin materials to, for example, vehicle interior materials to decorate the surface of molded bodies, for example.

An object of an embodiment of the present invention is to provide a synthetic resin skin material that has a freely selected three-dimensional shape including a deep concave-convex pattern that can be maintained for a long time and the change of which over time is suppressed, that is applicable to vehicle interior materials, and that has excellent durability.

An object of another embodiment of the present invention is to provide a method for manufacturing a synthetic resin skin material that has a freely selected three-dimensional shape including a deep concave-convex pattern that can be maintained for a long time and the change of which over time is suppressed, that is applicable to vehicle interior materials, and that has excellent durability.

Solution to Problem

Means for solving the above problems include the following aspects.
(1) A synthetic resin skin material, including, in this order: a base fabric; a thermoplastic resin layer having a storage elastic modulus at 160° C. of 2,000,000 Pa or less measured in accordance with JIS K 7244 (1998); and a skin layer including a urethane resin, wherein the synthetic resin skin material has recesses at a side of the skin layer, the recesses having a depth, in a thickness direction of the synthetic resin skin material, that extends from the skin layer as far as an inner part of the thermoplastic resin layer, past a boundary that is present between the skin layer and the thermoplastic resin layer at a non-recessed region.
(2) The synthetic resin skin material according to (1), wherein the thermoplastic resin layer contains a polyvinyl chloride resin and a plasticizer.
(3) The synthetic resin skin material according to (2), wherein the polyvinyl chloride resin includes oil-nonabsorbent polyvinyl chloride resin particles having an average particle diameter of 5 μm or less.
(4) The synthetic resin skin material according to any one of (1) to (3), further including an adhesion layer between the base fabric and the thermoplastic resin layer.

(5) The synthetic resin skin material according to any one of (1) to (4), further including a surface treatment layer at an opposite side of the skin layer from a side of the thermoplastic resin layer.

(6) The synthetic resin skin material according to any one of (1) to (5), wherein the base fabric includes a knitted fabric containing at least one fiber selected from the group consisting of a polyester fiber, a rayon fiber, a vinyl chloride fiber, a vinylidene chloride fiber, an aramid fiber, and an acrylic fiber.

(7) A method for manufacturing a synthetic resin skin material, the method including:

forming a skin layer containing a urethane resin using a composition for forming a skin layer containing a urethane resin;

applying, to one side of the skin layer, a composition for forming a thermoplastic resin layer, the composition for forming a thermoplastic resin layer containing a polyvinyl chloride resin having a storage elastic modulus at 160° C. of 2,000,000 Pa or less measured in accordance with JIS K 7244 (1998), and a plasticizer in an amount of 35 to 120 parts by mass with respect to 100 parts by mass of the polyvinyl chloride resin, to form a laminate of the skin layer and a thermoplastic resin layer having a storage elastic modulus at 160° C. of 2,000,000 Pa or less measured in accordance with JIS K 7244 (1998);

adhering a base fabric to a surface of the laminate at a side of the thermoplastic resin layer; and bringing an embossing roller into contact with the laminate on a surface at a side of the skin layer, the laminate having the base fabric adhered thereto, to perform embossing to form recesses, wherein, in forming the recesses, recesses, having a depth, in a thickness direction of the synthetic resin skin material, that extends from the skin layer as far as an inner part of the thermoplastic resin layer from the skin layer, past a boundary that is present between the skin layer and the thermoplastic layer at a non-recessed region, are formed at the surface at the side of the skin layer of the laminate.

(8) The method for manufacturing a synthetic resin skin material according to (7), wherein the polyvinyl chloride resin having a storage elastic modulus at 160° C. of 2,000,000 Pa or less measured in accordance with JIS K 7244 (1998) includes oil-nonabsorbent polyvinyl chloride resin particles having an average particle diameter of 5 μm or less.

(9) The method for manufacturing a synthetic resin skin material according to (7) or (8), further including forming an adhesion layer between the thermoplastic resin layer and the base fabric.

(10) The method for manufacturing a synthetic resin skin material according to any one of (7) to (9), wherein, in the embossing, a surface temperature of the skin layer at a side that is in contact with the embossing roller is from 90 to 210° C.

Although the mechanism of action of the synthetic resin skin material in the present disclosure is not clear, it is considered as follows.

The synthetic resin skin material in the present disclosure has, as a thermoplastic resin layer, a thermoplastic resin layer having a storage elastic modulus at 160° C. of 2,000,000 Pa or less measured in accordance with JIS K 7244 (1998), which has favorable shape-forming property and shape-retaining property of formed concave-convex patterns. The thermoplastic resin layer preferably contains a thermoplastic resin having a storage elastic modulus at 160° C. of 2,000,000 Pa or less measured in accordance with JIS K 7244 (1998). Hereinafter, the thermoplastic resin having a storage elastic modulus at 160° C. of 2,000,000 Pa or less measured in accordance with JIS K 7244 (1998) may be referred to as a specific resin.

The thermoplastic resin layer containing the specific resin functions as an embossment deformation layer that retains a three-dimensional shape including a concave-convex pattern formed on the synthetic resin skin material. Further, since the synthetic resin skin material has a skin layer containing a urethane resin, which has excellent feel and appearance, on the surface of the thermoplastic resin layer, the synthetic resin skin material is also advantageous in that it has excellent appearance and feel, and further, the skin layer follows the shape of the embossing well.

Accordingly, the concave-convex pattern formed by embossing, including the recesses having a depth that extends from the urethane resin skin layer as far as an inner part of the thermoplastic resin layer, past the boundary that is present between the urethane resin skin layer and the thermoplastic resin layer at a non-recessed region, can be retained for a long time by the function of the specific resin contained in the thermoplastic resin layer. Further, it is presumed that, by the function of the skin layer containing a urethane resin, which has excellent feel as well as excellent durability, and the thermoplastic resin layer containing the specific resin, which has excellent shape-retention property, the durability of the synthetic resin skin material is further improved.

In a preferred aspect, it is believed that a synthetic resin skin material was provided in which, by the thermoplastic resin layer containing a polyvinyl chloride resin having flexibility and a plasticizer, shape-forming property of the concave-convex pattern and shape-retention property of the concave-convex pattern are further improved owing to the flexibility of the polyvinyl chloride resin, which is inherent therein, and durability such as wear resistance is further improved owing to the skin layer containing a urethane resin.

Although the base fabric used in the synthetic resin skin material in the present disclosure is not particularly limited, selecting a knitted fabric containing at least a synthetic fiber, which is excellent in elasticity and stretching property as well as embossing processability, such as a polyester fiber, is advantageous in that the retention property of the concave-convex pattern and the flexibility of the synthetic resin skin material are further improved.

As described above, the synthetic resin skin material in the present disclosure has a three-dimensional shape including a deep concave-convex pattern, retains the deep concave-convex pattern for a long time, and has favorable durability, it can be suitably used for vehicle interior materials and others, and can impart designs characteristic to the products.

Advantageous Effects of Invention

According to an embodiment of the present disclosure, a synthetic resin skin material that has a freely selected three-dimensional shape including a deep concave-convex pattern that can be maintained for a long time and the change of which over time is suppressed, that is applicable to vehicle interior materials, and that has excellent durability, can be provided.

According to another embodiment of the present disclosure, a method for manufacturing a synthetic resin skin material that has a freely selected three-dimensional shape including a deep concave-convex pattern that can be maintained for a long time and the change of which over time is suppressed, that is applicable to vehicle interior materials, and that has excellent durability, can be provided.

DESCRIPTION OF EMBODIMENTS

Figure 1A:
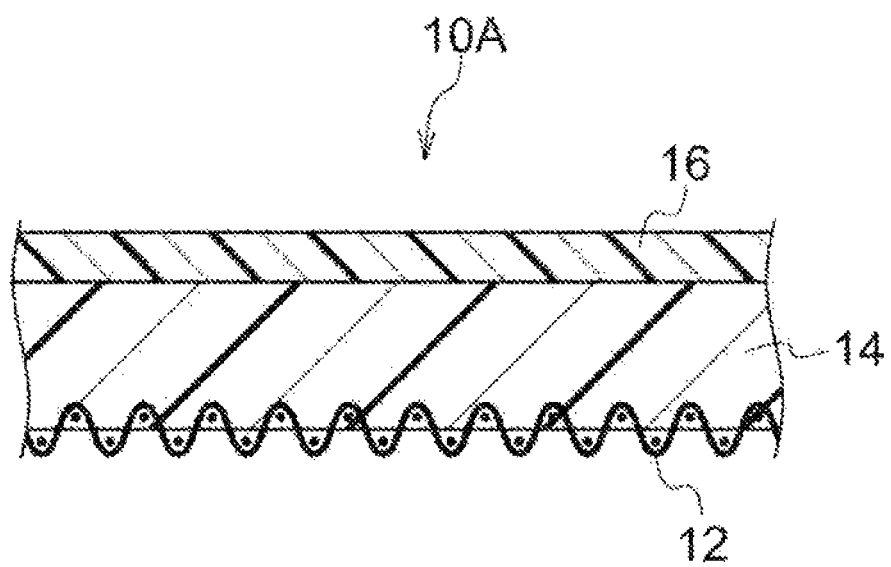
FIG. 1A is a schematic cross-sectional view showing the layer configuration of an embodiment of a laminate for forming a synthetic resin skin material according to the present disclosure.

Hereinafter, preferred embodiments in the present disclosure will be described.

Although explanation of the constituent elements in the embodiments described below may be based on representative embodiments in the present disclosure, the present disclosure is not limited to such embodiments.

In the present disclosure, the expression "(from) . . . to . . . ", which indicates a numerical range, is used to mean that the numerical values before and after the word "to" are included as the lower limit value and the upper limit value.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, the combination of preferred embodiments is a more preferred embodiment.

In the present disclosure, an amount of each component in a composition means the total amount of plural substances present in the composition unless otherwise specified, in a case in which plural substances corresponding to each component are present in the composition.

In the present disclosure, the term "process" does not only mean an independent process, but also includes processes that cannot be clearly distinguished from other processes as long as the intended purpose of the process is achieved.

Synthetic Resin Skin Material

A Synthetic resin skin material in the present disclosure includes, in this order: a base fabric; a thermoplastic resin layer having a storage elastic modulus at 160° C. of 2,000,000 Pa or less measured in accordance with JIS K 7244 (1998); and a skin layer containing a urethane resin (which may be referred to as a "skin layer" hereinafter), wherein the synthetic resin skin material has recesses at the side of the skin layer, the recesses having a depth, in a thickness direction of the synthetic resin skin material, that extends from the skin layer as far as an inner part of the thermoplastic resin layer, past a boundary that is present between the skin layer and the thermoplastic resin layer at a non-recessed region.

The thermoplastic resin layer preferably contains a thermoplastic resin having a storage elastic modulus at 160° C. of 2,000,000 Pa or less measured in accordance with JIS K 7244 (1998).

First, the synthetic resin skin material will be described with reference to the Drawings. In the following Drawings, the same reference numerals refer to the same components.

First, the synthetic resin skin material will be described with reference to the Drawings. In the following Drawings, the same reference numerals refer to the same components.

FIG. 1A is a schematic view showing the layer configuration of an embodiment of a laminate 10A for forming a synthetic resin skin material in the present disclosure. The embodiment shown in FIG. 1A is an example of the simplest layer configuration of the synthetic resin skin material in the present disclosure.

In the embodiment shown in FIG. 1A, the laminate 10A for forming a synthetic resin skin material includes a base fabric 12, and a thermoplastic resin layer 14 containing a specific resin and a skin layer 16 containing a urethane resin, disposed thereon in this order. By performing embossing on this laminate 10A to form a concave-convex pattern, the synthetic resin skin material 10 in the present disclosure having recesses 18 having a depth that extends from the skin layer 16 as far as the thermoplastic resin layer 14, shown in FIG. 1B, can be obtained.

Figure 4:
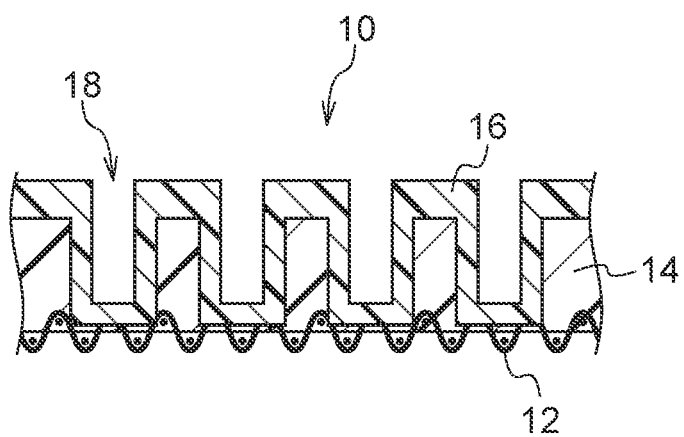
FIG. 4 is a schematic cross-sectional view showing the layer configuration of another embodiment of a synthetic resin skin material according to the present disclosure in which a concave-convex pattern is formed on the laminate for forming the synthetic resin skin material.

Here, the recesses 18 may have a depth that extends as far as an inner part of the base fabric 12, past the boundary that is present between the thermoplastic resin layer 14 and the base fabric 12, for example as shown in FIG. 4.

Figure 1B:
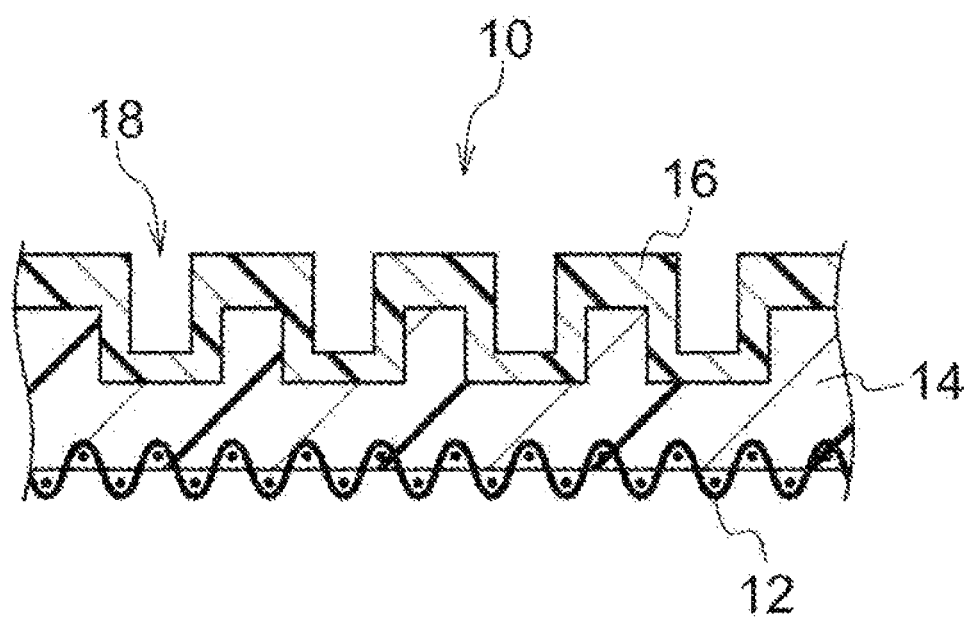
FIG. 1B is a schematic cross-sectional view showing the layer configuration of an embodiment of a synthetic resin skin material according to the present disclosure in which a concave-convex pattern is formed on the laminate for forming the synthetic resin skin material shown in FIG. 1A.

As shown in FIG. 1B, the synthetic resin skin material 10 has the base fabric 12, and the thermoplastic resin layer 14 containing a specific resin and the skin layer 16 containing a urethane resin, provided thereon in this order, and has the recesses 18 at the side of the skin layer 16, the recesses 18 having a depth that, in the thickness direction of the synthetic resin skin material 10, that extends from the skin layer 16 as far as an inner part of the thermoplastic resin layer 14, past the boundary that is present between the skin layer 16 and the thermoplastic resin layer 14 at a region having no recesses 18.

The layer configuration of the synthetic resin skin material in the present disclosure is not particularly limited as long as it includes a base fabric, a skin layer, and a thermoplastic resin layer described below in detail, and may further include other layer(s) that are commonly provided to synthetic resin skin materials, as long as the effect is not impaired. These other layer(s) will be described hereafter.

The depth of the recesses of the concave-convex pattern formed on the synthetic resin skin material can be measured by cutting the synthetic resin skin material perpendicularly to the surface direction, and observing the cross section with an optical microscope. In the present disclosure, the depths of the recesses is obtained by measuring the depths of the recesses at three points using an optical microscope with a magnification of 50× to 100×, and taking the arithmetic average of the measured values.

Hereinafter, the synthetic resin skin material in the present disclosure (which may be simply referred to as a "skin material" hereinafter) will be sequentially described together with the materials constituting the synthetic resin skin material and the manufacturing method thereof.

1. Base Fabric

The base fabric of the skin material in the present disclosure is not particularly limited as long as it has required strength and durability, and can be appropriately selected from known base fabrics, according to the purpose, and used. The base fabric may be any of a knitted fabric, a woven fabric, or a non-woven fabric.

In a case in which the skin material is applied to a molded body having irregularities, it is preferable to use a knitted fabric or a woven fabric having a certain degree of stretchability. From the viewpoint of favorable feel and shape followability, it is more preferable to use a knitted fabric.

As the base fabric, for example, in the case of use as a skin material for a vehicle seat, a knitted fabric, such as a stockinette stitch fabric or a modified stockinette stitch fabric may be used from the viewpoint of stretchability and ease of controlling thickness.

Further, a fabric such as a three-dimensional structured base fabric or a three-dimensional non-woven fabric having a space between an outer material and an inner material may also be used.

Examples of the material of the fiber (yarn) used for knitting and weaving the base fabric include polyester, rayon, linen, cotton, vinyl chloride, vinylidene chloride, aramid, acrylic, phenolic, and carbon fibers and the like, and blended yarn containing these fibers may also be used.

From the viewpoint of embossing processability and the like, the base fabric is preferably a knitted fabric containing at least one fiber selected from the group consisting of a polyester fiber, a rayon fiber, a vinyl chloride fiber, a vinylidene chloride fiber, an aramid fiber, and an acrylic fiber. In particular, it is more preferable that the base fabric contains a polyester fiber from the viewpoint of durability for use as a vehicle interior material or from the viewpoint of cost.

As the base fabric, in addition to the stockinette stitch fabric, for example, a base fabric for synthetic leather using a ponte fabric described in Japanese Patent Application Laid-Open (JP-A) No. 2013-72141 may also be used.

The thickness of the base fabric is appropriately selected in accordance with the intended use of the skin material. A range that is excellent in feel and that does not reduce the flexibility of the skin material is preferable, for example, a range of from 0.15 to 10.0 mm is preferable, and a range of from 0.3 to 1.5 mm is more preferable.

If necessary, raising processing may be performed at the surface of the skin layer side of the base fabric. Further, as the base fabric, a pile stitch fabric in which a pile is formed at the surface of the skin layer side of the base fabric may be used. By having nap or pile on the surface of the base fabric, adhesiveness with an adjacent layer such as a thermoplastic resin layer, a skin layer or the like is further improved.

As the base fabric, a commercially available product may also be used. Examples of the commercially available product include a knitted fabric of polyester yarn (a knitted fabric of polyester yarn (melting point: 254° C.) of 150 dtex/48f, thickness: 0.9 mm), manufactured by Hayashi Telempu Corporation and the like.

2. Skin Layer Containing Urethane Resin

The skin layer of the skin material in the present disclosure is disposed at one side of the above-described base fabric.

From the viewpoint of durability, favorable elasticity, and favorable processability in forming deep recesses, the skin layer in the present disclosure contains a urethane resin (hereinafter also referred to as polyurethane).

The synthetic resin used for forming the skin layer is not particularly limited as long as the skin layer contains a urethane resin, and other synthetic resin(s) may be selected and used in addition to the urethane resin in accordance with the purpose. Examples of these other synthetic resin(s) include a polyvinyl chloride resin, an acrylic resin, a polyester resin and the like.

Examples of the polyurethane used for forming the skin layer include a polycarbonate-based polyurethane, a polyether-based polyurethane, a polyester-based polyurethane and a modified polyurethane thereof.

From the viewpoint of the synthetic resin skin material in the present disclosure being used for applications in which long-term durability is required, for example, for chairs or automotive interior materials, a polycarbonate-based polyurethane is preferable.

As the polyurethane, a commercially available product may also be used. For example, Clisvon (registered trademark) NY-324 manufactured by DIC Corporation is preferably used.

The polyurethane used for forming the skin layer preferably has a hardness of 49 to 980 $N/cm^2$, and more preferably has a hardness of 196 to 588 $N/cm^2$, in terms of 100% modulus, the hardness being measured in accordance with JIS K 6301.

The softening point of the polyurethane is preferably 130° C. or more, and more preferably 150° C. or more.

The skin layer may contain one type of polyurethane or may contain two or more types of polyurethanes.

The skin layer may contain other component(s) in addition to the polyurethane.

Examples of these other component(s) include a synthetic resin other than those described above, a stabilizer, a filler, a colorant, a flame retardant, a gelation accelerator and the like.

Colorant

The skin layer may contain a colorant. By the skin layer containing a colorant, a desired hue can be imparted to the skin material, and a skin material that is excellent in design can be obtained.

In the case in which the skin layer contains a colorant, the colorant is not particularly limited, and a dye, a pigment or the like may be appropriately selected and used. From the viewpoint of being better in durability and light resistance, a pigment is preferable.

Examples of the colorant include an inorganic pigment, such as titanium white (titanium dioxide), zinc oxide, ultramarine blue, cobalt blue, red iron oxide, vermilion, chrome yellow, titan yellow, or carbon black; an organic pigment or dye, such as quinacridone, permanent red 4R, isoindolinone, Hansa yellow A, phthalocyanine blue, indanthrene blue RS, or aniline black; a metallic pigment selected from the group consisting of metallic foil powders such as those of aluminum or brass; and a pearlescent (pearl) pigment selected from the group consisting of foil powders of titanium dioxide-coated mica or basic lead carbonate.

In a case in which a pigment is used as the colorant, a pigment dispersant, such as a surfactant or a polymer dispersant, may be used in combination.

Other Component(s)

The skin layer may contain a filler. Examples of the filler include an inorganic filler such as calcium carbonate, silica (silicon dioxide), alumina (aluminum oxide), mica, talc, or barium sulfate. The skin layer may contain only one type of filler, or may contain two or more types of fillers.

The skin layer may contain a stabilizer. By the skin layer containing a stabilizer, heat resistance of the skin layer is improved.

Examples of the stabilizer include: a fatty acid metal salt, such as magnesium stearate, aluminum stearate, calcium stearate, barium stearate, zinc stearate, calcium laurate, barium laurate, or zinc laurate; a sodium compound, such as that of phenol or naphthol; a metallic salt, such as that of zinc or barium; an organotin compound, such as dibutyltin dilaurate or dibutyltin dimalate; and a phosphite ester, such as diethyl phosphite, dibutyl phosphite, dioctyl phosphite, diphenyl isodecylphosphite, tricresyl phosphite, triphenyl phosphite, tris(nonylphenyl) phosphite or triisooctyl phosphite. The skin layer may contain only one type of stabilizer, or may contain two or more types of stabilizers.

The skin layer may contain a flame retardant. By the skin layer containing a flame retardant, the skin material can be imparted with flame retardance. As the flame retardant, a known inorganic or organic flame retardant can be appropriately selected and used. The skin layer may include only one type of flame retardant, or may include two or more types of flame retardants.

The skin layer may include synthetic resin(s) other than polyurethane for the purpose of improving membrane properties and the like. In the case in which the skin layer contains resin(s) other than polyurethane, the content of the resin(s) other than polyurethane is preferably 10 parts by mass or less with respect to 100 parts by mass of the total solid content of the skin layer.

Formation of Skin Layer

There is no particular limitation to the formation of the skin layer, and the skin layer can be formed by preparing a composition for forming a skin layer containing the above-described components and forming the skin layer into a sheet by a calendar method, a paste processing method, a melt extrusion method, or the like. Further, the skin layer may also be formed by applying a composition for forming a skin layer directly to a releasing substrate. Here, in a case in which a substrate having a fine concave-convex pattern called a grain pattern is used as the releasing substrate, a fine concave-convex pattern is formed at the surface of the skin layer. The depth of the concave-convex pattern of the grain pattern is 150 μm or less, and therefore, the grain pattern is distinguished from the deep concave-convex pattern described hereinafter.

The thickness of the skin layer is not particularly limited. From the viewpoint of favorable flexibility and feel, the skin layer preferably has a thickness of from 10 to 300 μm, and more preferably from 20 to 200 μm.

3. Thermoplastic Resin Layer

The thermoplastic resin layer in the present disclosure is a thermoplastic resin layer that has a storage elastic modulus at 160° C. of 2,000,000 Pa or less measured in accordance with JIS K 7244 (1998). The storage elastic modulus of the thermoplastic resin layer is preferably 1,800,000 Pa or less, and more preferably 1,500,000 Pa or less. Further, the storage elastic modulus may be 5,000 Pa or more from the viewpoint of embossing processability.

Examples of the thermoplastic resin contained the thermoplastic resin layer include polyvinyl acetate, polyvinyl chloride, polyvinylidene chloride, and polystyrene.

In order to achieve the foregoing preferable storage elastic modulus, the thermoplastic resin layer preferably contains a thermoplastic resin having a storage elastic modulus at 160° C. of 2,000,000 Pa or less (specific resin) measured in accordance with JIS K 7244 (1998).

As the specific resin contained in the thermoplastic resin layer, any thermoplastic resin may be used without limitation for the formation of the thermoplastic resin layer, as long as it is a thermoplastic resin that has a storage elastic modulus at 160° C. of 2,000,000 Pa or less measured in accordance with JIS K 7244 (1998), and that is capable of imparting to the thermoplastic resin layer a function as an embossment deformation layer that has favorable properties for forming a concave-convex pattern by embossing and for retaining the shape.

Examples of the specific resin include polyvinyl acetate, polyvinyl chloride, polyvinylidene chloride, polystyrene, and the like that satisfy the physical property of the foregoing storage elastic modulus, and the most suitable resin can be selected and used in view of the properties required for the synthetic resin skin material.

In particular, polyvinyl chloride is favorable from the viewpoint that it has been adopted for vehicle interior materials.

As the polyvinyl chloride resin, as a specific resin, a commercially available product may also be used. Examples of the commercially available product include a Ryuron Paste (registered trademark) series by Tosoh Corporation, and a PSH series, a PSM series, and a PSL series by Kaneka Corporation.

Although polyvinyl chloride resins generally form secondary particles and include spaces inside thereby having oil-absorbing property, the Ryuron Paste (registered trademark) series by Tosoh Corporation is oil-nonabsorbent polyvinyl chloride resin particles having no pores or spaces and having an average particle diameter of 5 μm or less.

The thermoplastic resin layer may contain only one type of specific resin, or may contain two or more types of specific resins. In the case in which two or more types of specific resins are contained, different kinds of resins may be used, or a mixture of two or more types of resins of the same kind having different degrees of polymerization may be used.

The thermoplastic resin layer may contain resin(s) other than the specific resin. The content of the specific resin with respect to the total resin contained in the thermoplastic resin layer is preferably from 30 to 80% by mass, and more preferably from 40 to 50% by mass.

The thermoplastic resin layer preferably contains polyvinyl chloride, as a specific resin, and a plasticizer. By the thermoplastic resin layer containing polyvinyl chloride and a plasticizer, the flexibility of the thermoplastic resin layer is further improved, whereby a thermoplastic resin layer having a storage elastic modulus at 160° C. of 2,000,000 Pa or less measured in accordance with JIS K 7244 (1998) can be easily obtained.

The content of the plasticizer is preferably from 35 to 120 parts by mass, and more preferably from 75 to 90 parts by mass, with respect to 100 parts by mass of the polyvinyl chloride.

As the plasticizer, any known plasticizer for polyvinyl chloride resin can be used without limitation.

Examples of the plasticizer include: a phthalate-based plasticizer, such as diisodecyl phthalate, di-2-ethylhexyl phthalate, or diisononyl phthalate; a fatty acid ester-based plasticizer, such as dioctyl adipate or dioctyl sebacate; a trimellitate-based plasticizer, such as trioctyl trimellitate; a triaryl phosphate-based plasticizer, such as tricresyl phosphate or trixylyl phosphate; an epoxy-based plasticizer, such as epoxidized soybean oil; and a polyester-based plasticizer, such as polypropylene adipate.

The thermoplastic resin layer may contain only one type of plasticizer, or may contain two or more types of plasticizers.

The thickness of the thermoplastic resin layer is not particularly limited. In the thermoplastic resin layer in the present disclosure, from the viewpoint of conferring superior functions as an embossment deformation layer, the thickness of the thermoplastic resin layer is preferably in the range of from 20 to 800 µm, and more preferably in the range of from 50 to 700 µm.

4. Other Layer(s)

The skin material in the present disclosure may include only a base fabric, a thermoplastic resin layer and a skin layer, or may include other known layer(s) depending on the purpose.

Figure 2A:
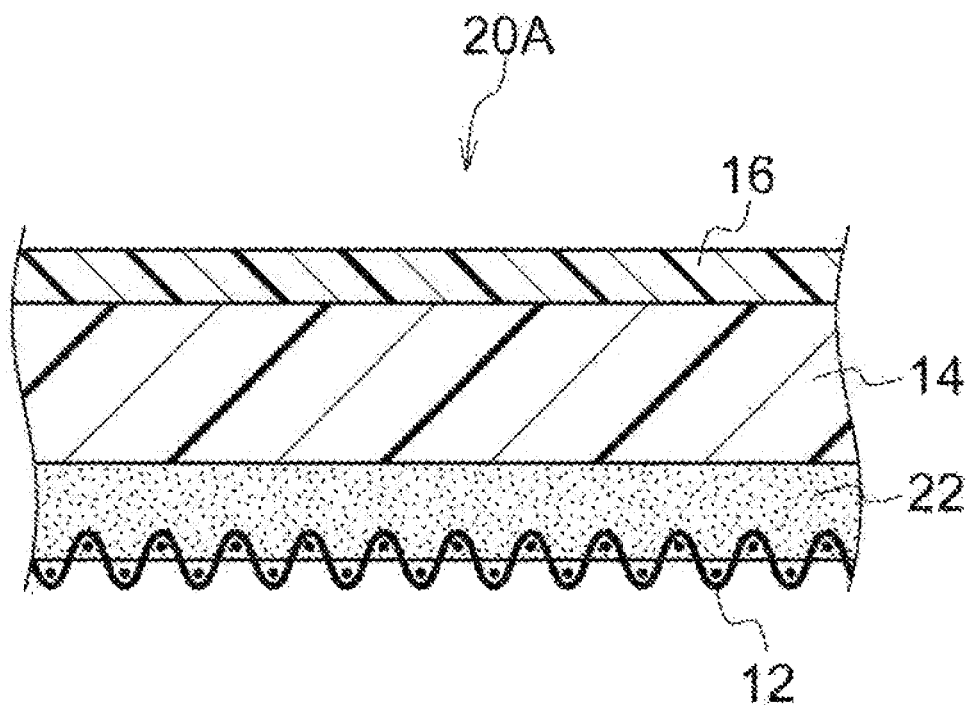
FIG. 2A is a schematic cross-sectional view showing the layer configuration of an embodiment of a laminate for forming a synthetic resin skin material according to the present disclosure that is further provided with an adhesion layer as an optional layer between the thermoplastic resin layer and the base fabric.
Figure 2B:
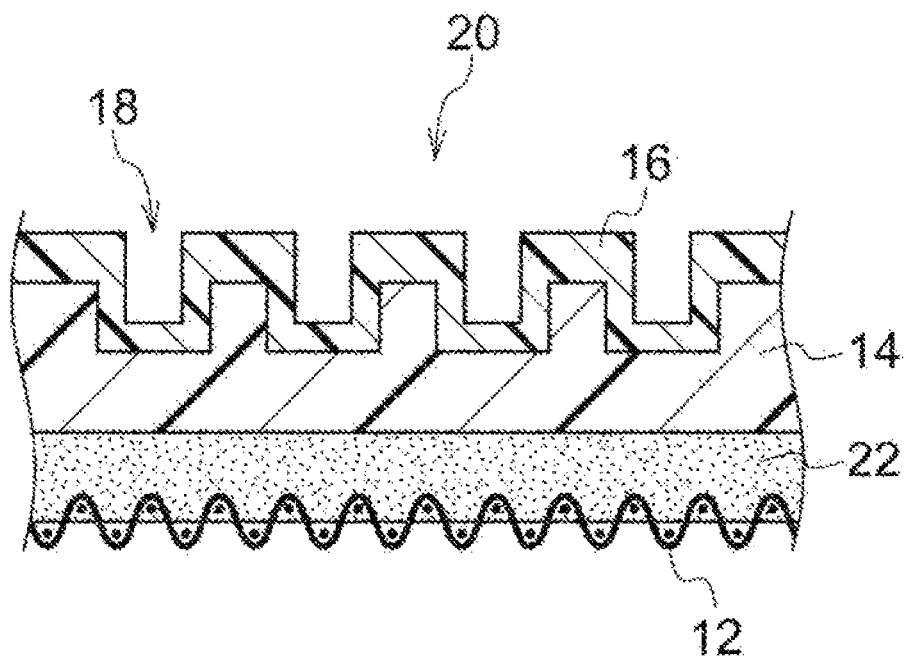
FIG. 2B is a schematic cross-sectional view showing the layer configuration of an embodiment of a synthetic resin skin material according to the present disclosure in which a concave-convex pattern is formed on the laminate for forming the synthetic resin skin material shown in FIG. 2A.

FIGS. 2A and 2B are schematic cross-sectional views showing another example of the layer structure of the skin material according to the present disclosure.

FIG. 2A is a schematic cross-sectional view showing the layer structure of an embodiment of a laminate 20A for forming another synthetic resin skin material according to the present disclosure.

In the embodiment shown in FIG. 2A, the laminate 20A for forming a synthetic resin skin material includes a base fabric 12, and an adhesion layer 22, a thermoplastic resin layer 14 containing a specific resin, and a skin layer 16 containing a urethane resin, disposed thereon in this order. The adhesion layer 22 is an optional layer that may be provided for the purpose of improving adhesion between the base fabric 12 and the thermoplastic resin layer 14.

By performing embossing on the laminate 20A to form a concave-convex pattern, a synthetic resin skin material 20 having a layer structure different from the synthetic resin skin material 10 shown in FIG. 1B of the present application can be obtained, the synthetic resin skin material 20 having recesses 18 at the side of the skin layer 16, the recesses having a depth, in the thickness direction of the synthetic resin skin material 20, that extends from the skin layer 16 as far as an inner part of the thermoplastic resin layer 14, past the boundary that is present between the skin layer 16 and the thermoplastic resin layer 14 at a region having no recesses 18.

By the skin material 20 including the adhesion layer 22, the base fabric 12 and the thermoplastic resin layer 14 adjacent to each other can be adhered more stably and strongly via the adhesion layer 22.

4-1. Adhesion Layer

The skin material in the present disclosure may further include an adhesion layer between the base fabric and the thermoplastic resin layer.

The adhesion layer is provided, for example, for the purpose of improving adhesion between adjacent layers, such as a base fabric and a thermoplastic resin layer.

The adhesion layer can be formed by, for example, applying an adhesive on the surface of the base fabric and drying it. The layering of the adhesive may be carried out by a transfer method or a coating method.

The adhesive used for forming the adhesion layer provided as desired is not particularly limited, and is appropriately selected in accordance with the purpose. As a resin that can be used for forming the adhesion layer, the most suitable one may be selected in view of the desired properties, such as polyurethane, polyvinyl chloride, polyvinylidene chloride, or polystyrene. Polyurethane and polyvinyl chloride are preferable from the viewpoint that they have been adopted for vehicle interior materials. More specifically, (1) a urethane emulsion adhesive, (2) a vinyl chloride adhesive, (3) a two-component polyester adhesive, (4) a two-component urethane adhesive and the like are preferably used.

When forming a laminate of a base fabric and a thermoplastic resin layer, usually, an adhesion layer can be formed by applying an adhesive to the surface of the base fabric.

The skin material may include only one adhesion layer, or may include two or more adhesion layers as necessary.

As described above, any known method, such as a transfer method or a coating method, can be used as the method for applying the adhesive.

Further, in a case in which the adhesion layer is formed by a transfer method, a protective sheet may be provided at the surface of the adhesion layer in order to protect the surface of the pre-prepared adhesion layer. As the protective sheet, a resin film, releasing paper, resin-laminated paper or the like can be appropriately used.

4-2. Surface Treatment Layer

The skin material may include a surface treatment layer at the opposite side of the skin layer from the side of the thermoplastic resin layer.

Providing the skin layer with the surface treatment layer enables, for example, imparting desired favorable feel to the skin material, further improving the appearance, or further improving the durability.

The surface treatment layer contains at least a resin, and if desired, may include organic particles as a filler and as a feel improver, in a case in which the surface treatment layer is provided for the purpose of further improving the feel, or may include a colorant or the like for the purpose of improving the design.

Further, a surface treatment layer that is located at the outermost surface of the skin material and formed as desired may be colored or printed, or may be formed with a natural leather-like concave-convex pattern typified by a grain pattern, in accordance with purpose.

Examples of the resin that may be contained in the surface treatment layer include polyurethane, an acrylic resin, a fluororesin, and a polyvinyl chloride resin. From the viewpoint of favorable feel, it is preferable to use polyurethane as a main material. Here, the "main material" means a resin having the highest content in a case in which multiple types of resins are used in combination.

Preferable examples of the polyurethane used for the surface treatment layer include a water-based polyurethane.

Examples of the acrylic resin used for the surface treatment layer include a polymer or a copolymer of methacrylic acid or methacrylate represented by poly(methyl methacrylate) (PMMA); and a copolymer of an alkyl methacrylate, an alkyl acrylate and styrene.

By including organic particles as a filler in the surface treatment layer, a moist and warm tactile sensation can be imparted to the skin material as compared with a case in which an amorphous inorganic filler, which has been conventionally used as a matting agent, is used.

Examples of the organic particles include organic resin particles, such as urethane beads and acrylic beads, and a protein-based filler, such as collagen particles.

The shape of the organic particles is preferably a true spherical shape or a spherical shape close to the true spherical shape, for example, one in which the ratio of the major diameter to the minor diameter is 1.5 or less, from the viewpoint of improving the feel. The average particle size of the organic particles is preferably in the range of from 1 to 20 μm, and more preferably in the range of from 5 μm to 10 μm. When the particle size is in the above range, the drop off of particles from the surface treatment layer and an adverse effect on appearance are suppressed, and a favorable appearance and an excellent texture can be maintained for a long period of time.

As the average particle size of the organic particles, the value measured by the method of measuring the volume-based median diameter is used, the median diameter being determined by using an automatic particle size measuring device (model number: CAPA-300) manufactured by Horiba, Ltd., and using a light transmission centrifugal sedimentation method at a disk rotation speed of 3,000 rpm (rotation/minute) using water as the dispersion medium.

The surface treatment layer may include only one type of organic particles, or may contain two or more types of organic particles.

The surface treatment layer may include a colorant to impart design as necessary. As the colorant, the general-purpose colorants described in connection with the skin layer may be similarly used, and the preferable content is also the same.

For the purpose of further improving the wear resistance, a surface treatment layer containing cross-linked structures may also be formed.

The thickness of the surface treatment layer is preferably in the range of from 2 to 10 and more preferably in the range of from 2 to 5 μm.

Since the skin material in the present disclosure includes a skin layer containing a urethane resin, and a thermoplastic resin layer as an embossment deformation layer, the skin material in the present disclosure has a freely selected three-dimensional shape such as a deep concave-convex pattern, maintains its three-dimensional shape for a long time, and has favorable durability, and further, the change in the shape over time is suppressed, and therefore, the skin material in the present disclosure can be suitably used for various applications that require durability, such as vehicle interior materials.

Manufacturing Method of Synthetic Resin Skin Material

The method for manufacturing the synthetic resin skin material in the present disclosure is not particularly limited. In particular, the synthetic resin skin material in the present disclosure is preferably manufactured by the method for manufacturing the synthetic resin skin material in the present disclosure (hereinafter, may be referred to as the manufacturing method in the present disclosure) indicated below.

The manufacturing method in the present disclosure includes a process of forming a skin layer using a composition for forming a skin layer containing a urethane resin (process (I)); applying, to one side of the skin layer, a composition for forming a thermoplastic resin layer, the composition for forming a thermoplastic resin layer containing a polyvinyl chloride resin having a storage elastic modulus at 160° C. of 2,000,000 Pa or less measured in accordance with JIS K 7244 (1998), and a plasticizer in an amount of 35 to 120 parts by mass with respect to 100 parts by mass of the polyvinyl chloride resin, to form a laminate of the skin layer and a thermoplastic resin layer (process (II)); adhering a base fabric to a surface of the laminate at the side of the thermoplastic resin layer (process (III)); and bringing an embossing roller into contact with the laminate on a surface at the side of the skin layer, the laminate having the base fabric adhered thereto, to perform embossing to form recesses at the surface of the skin layer side of the laminate, the recesses having a depth that extends from the skin layer containing a urethane resin as far as the thermoplastic resin layer (process (IV)).

Here, the polyvinyl chloride resin having a storage elastic modulus at 160° C. of 2,000,000 Pa or less measured in accordance with JIS K 7244 (1998) preferably includes oil-nonabsorbent polyvinyl chloride resin particles having an average particle size of 5 μm or less.

Examples of the oil-nonabsorbent polyvinyl chloride resin particles having an average particle diameter of 5 μm or less include Ryuron Paste (registered trademark) 630 (manufactured by Tosoh Corporation), which exhibits moldability when mixed with a plasticizer.

Further, the manufacturing method in the present disclosure may optionally include a process of applying an adhesive between the base fabric and the thermoplastic resin layer to form an adhesion layer (process (V)), and/or forming a surface treatment layer at the opposite side of the skin layer from the thermoplastic resin layer (process (VI)).

The manufacturing method in the present disclosure will be described in detail for each process.

Process (I)

Process (I) is a process of forming a skin layer using a composition for forming a skin layer containing a urethane resin.

Any method can be employed for forming the skin layer, and examples thereof include a calendar method, a paste processing method, and a melt extrusion method.

Preferable examples include a method of applying a pre-prepared composition for forming a skin layer containing a urethane resin to a surface of an appropriate releasing substrate using a known coating method such as using a knife coater. In this case, by using a releasing substrate having a fine concave-convex pattern on the surface, a fine concave-convex pattern can be formed at the surface of the skin layer (opposite side from the thermoplastic resin layer) by transfer.

Further, the composition may be formed into a sheet by the calendar method to form the skin layer.

Process (II)

Process (II) is a process of applying, to one side of the skin layer obtained in the process (I), a composition for forming a thermoplastic resin layer, the composition for forming a thermoplastic resin layer containing a polyvinyl chloride resin having a storage elastic modulus at 160° C. of 2,000,000 Pa or less measured in accordance with JIS K 7244 (1998), and a plasticizer in an amount of 35 to 120 parts by mass with respect to 100 parts by mass of the polyvinyl chloride resin, to form a laminate of the skin layer and a thermoplastic resin layer.

The polyvinyl chloride resin described in the section of the synthetic resin skin material can be used for the polyvinyl chloride resin having a storage elastic modulus at 160° C. of 2,000,000 Pa or less measured in accordance with JIS K 7244 (1998).

The composition for forming a thermoplastic resin layer contains at least a polyvinyl chloride resin that is a specific resin, and a plasticizer in an amount of 35 to 120 parts by mass with respect to 100 parts by mass of the polyvinyl chloride resin, and if desired, may contain a solvent or other component(s) depending on the purpose.

As the method for applying the composition for forming a thermoplastic resin layer to the skin layer, known methods can be applied. By applying a composition for forming a thermoplastic resin layer to the skin layer, and drying and curing the composition, a laminate of the skin layer and a thermoplastic resin layer can be formed.

Examples of the method for applying a composition for forming a thermoplastic resin layer include a method of using a knife coater or the like.

Further, the laminate may be formed by laminating a thermoplastic resin layer that has been previously molded into a sheet shape.

Process (III)

Process (III) is a process of adhering a base fabric to a surface of the laminate of the skin layer and the thermoplastic resin layer obtained in the process (II) at the side of the thermoplastic resin layer.

In adhering the laminate and the base fabric, the base fabric may be adhered to the surface of the laminate at the side of the composition for forming a thermoplastic resin layer.

Raising processing may be carried out on the side of the base fabric in contact with the thermoplastic resin layer by a conventional method.

The adhesion may be conducted by pressure-bonding the base fabric to the thermoplastic resin layer before the composition for forming a thermoplastic resin layer is completely cured and carrying out the curing thereafter, or may be conducted by applying an adhesive to the base fabric, which is then adhered to the thermoplastic resin layer via the adhesion layer. In the case in which an adhesion layer is formed, this can be conducted by the optional process of forming an adhesion layer described hereinafter (process (V)) after the process (II) and before the process (III).

The adhesive for forming the adhesion layer and preferable thicknesses of the adhesion layer are as described above.

Process (IV)

Process (IV) is a process of bringing an embossing roller in contact with the laminate, which has been obtained in the process (III) and has a base fabric adhered thereto, on the surface at the side of the skin layer, to perform embossing to form recesses, in which in forming the recesses, recesses having a depth that extends from the skin layer containing a urethane resin as far as the thermoplastic resin layer are formed at the surface at the skin layer side of the laminate.

Figure 3:
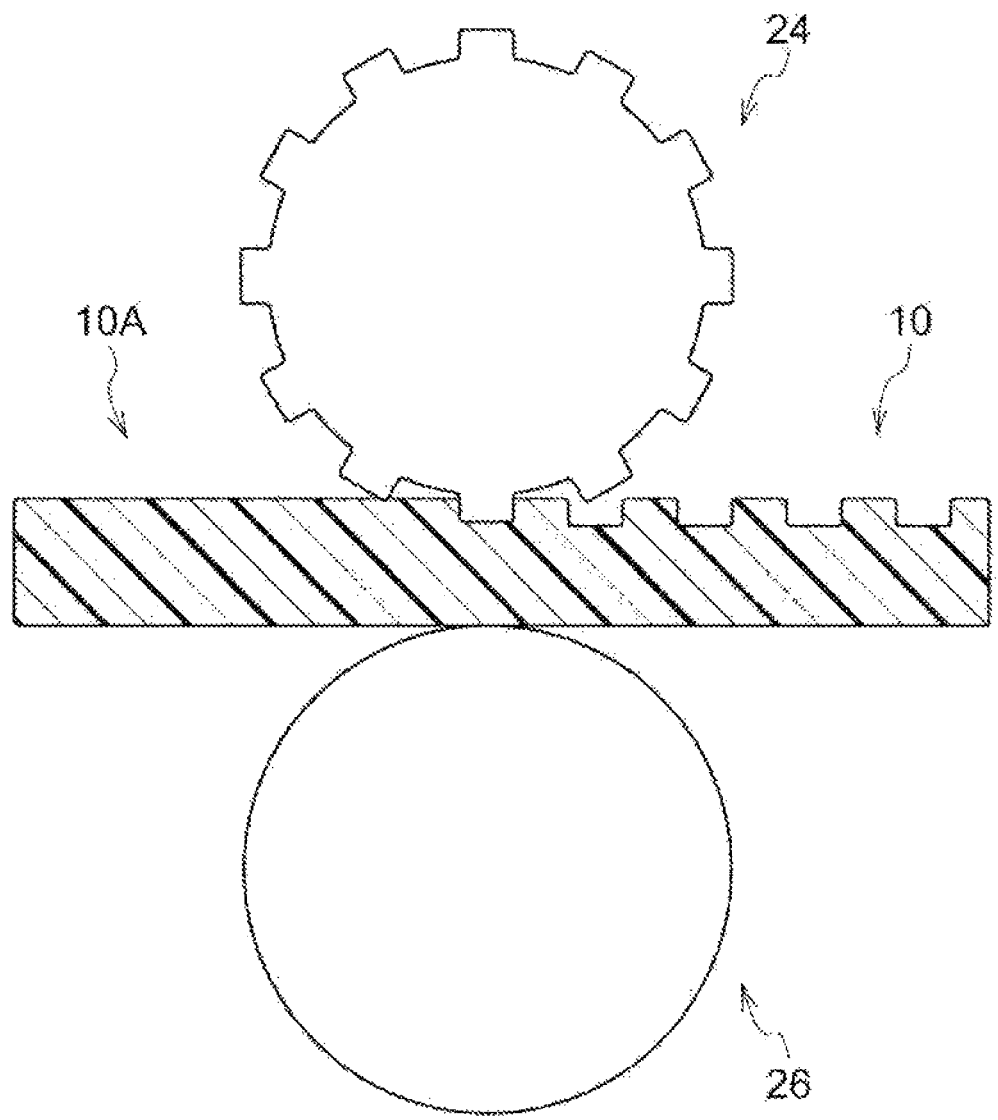
FIG. 3 is a schematic view of an embodiment of the embossing for obtaining a synthetic resin skin material by forming a deep concave-convex pattern on a laminate for forming a synthetic resin skin material.

FIG. 3 is a schematic view showing an embodiment of embossing to obtain a synthetic resin skin material by forming a deep concave-convex pattern on the laminate 10A for forming a synthetic resin skin material obtained in the process (III).

As shown in FIG. 3, the laminate 10A for forming a synthetic resin skin material is heat-pressed between an embossing roller 24 for imparting a shape and a backup roller 26 of an embossing machine having the pair of embossing rollers, whereby a deep concave-convex pattern is formed on the laminate 10A and the synthetic resin skin material 10 is obtained.

Examples of the method of the embossing include a method of heating the skin layer side of the laminate with a heater or the like, and thereafter applying the shape with an embossing roller, as well as a method of using a flat embossing plate. Further, the shape may be applied by heating the embossing roller or embossing plate itself.

In the embossing, freely determined space may be provided between the laminate for forming a synthetic resin skin material and the embossing roller or embossing plate depending on the desired design or thickness.

The conditions of the embossing machine can be selected in accordance with the purpose.

For example, in the case of embossing using an embossing roller, the heating temperature is preferably in the range of from 90 to 210° C., and more preferably in the range of from 130 to 170° C., in terms of the surface temperature of the side of the skin layer in contact with the embossing roller. This can be conducted by adjusting the heater of the embossing roller such that the surface temperature becomes within the above ranges.

The pressure during the embossing is preferably from 0.1 to 50 kgf/cm$^2$, more preferably from 1 to 20 kgf/cm$^2$, and further preferably from 1.5 to 10 kgf/cm$^2$. Here, 1 kgf/cm$^2$ can be converted into 9.80665×10 kPa in the SI unit.

The processing speed is preferably from 0.5 to 20 m/min., more preferably from 1 to 10 m/min. and further preferably from 1.5 to 5 m/min.

Further, in the case of, for example, embossing using an embossing plate, the heating temperature is preferably in the range of from 90 to 210° C., and more preferably in the range of from 130 to 170° C., in terms of the surface temperature of the laminate at the side of the urethane skin material. This can be conducted by adjusting the heater of the embossing plate such that the surface temperature becomes within the above ranges.

The pressure during the pressing using an embossing plate is preferably from 0.1 to 50 kgf/cm$^2$, more preferably from 1 to 20 kgf/cm$^2$, and further preferably from 1.5 to 10 kgf/cm$^2$.

The duration of the pressing is preferably from 10 to 90 seconds, more preferably from 15 to 80 seconds, and further preferably from 20 to 70 seconds.

After the process (IV), the synthetic resin skin material in the present disclosure having a deep three-dimensional shape and a concave-convex pattern can be obtained.

The recesses formed in the process (IV) are recesses having a depth, in the thickness direction of the synthetic resin skin material, that extends from the skin layer as far as an inner part of the thermoplastic resin layer, past the boundary that is present between the skin layer and the thermoplastic resin layer at a non-recessed region. The depth of the recesses may be a depth that extends as far as an inner part of the base fabric, past the boundary that is present between the thermoplastic resin layer and the base fabric.

Other Processes

Process (V) is an optional process of forming an adhesion layer.

The formation of the adhesion layer is carried out by applying an adhesive to the surface of the base fabric or the thermoplastic resin layer to form an adhesion layer, and thereafter adhering the two via the adhesion layer.

The adhesion layer can be formed by, for example, applying an adhesive to the surface of the base fabric or the thermoplastic resin layer. In particular, it is preferable to form the adhesion layer by applying an adhesive to the surface of the base fabric and drying the adhesive to form an adhesion layer.

The adhesive used for forming an adhesion layer, which is optionally provided, is as described above in the section of the adhesion layer.

Examples of the method for applying an adhesive include a transfer method and a coating method.

By applying an adhesive to the surface of the base fabric or the thermoplastic resin layer, and heating and drying the applied adhesion layer, an adhesion layer is formed on one side of the base fabric or the thermoplastic resin layer.

Process (VI) is a process of forming a surface treatment layer (e.g., feel improvement layer) at the surface of the skin layer (the surface at the opposite side of the skin layer from the base fabric side) in order to further improve the feel and appearance.

The process (VI) is performed by applying a composition for forming a surface treatment layer containing a resin to the surface of the skin layer.

The composition for forming a surface treatment layer can be applied by appropriately adopting a known method.

The surface treatment layer can be formed by adopting a method appropriately selected from those such as coating by a gravure printing method and coating by a coating device such as a reverse coater or a direct coater. In particular, from the viewpoint that a uniform layer can be formed, a gravure printing method is preferable.

The details of the surface treatment layer are as described above.

In the manufacturing method in the present disclosure, if necessary, a process of imparting a design for further improving appearance can be performed.

After completing the processes (I) to (IV) and optionally performed other process(es) described above, the process of imparting a design can be performed.

Examples of the process of imparting a design includes, for example, a process in which a grain pattern is formed on the surface of the skin layer or the surface treatment layer provided as desired, for example, by pressing an embossing roller having a grain pattern, which is a leather-like fine concave-convex pattern, engraved therein, with the surface thereof being heated.

The synthetic resin skin material in the present disclosure obtained by the manufacturing method in the present disclosure can include, on the outermost surface, a skin layer having favorable flexibility and feel, or a surface treatment layer having favorable feel. Therefore, the synthetic resin skin material in the present disclosure obtained by the manufacturing method in the present disclosure is suitably used for the decoration of a molded body having excellent durability, such as wear resistance, as a skin material of a molded body having a complicated shape.

The synthetic resin skin material in the present disclosure can be manufactured by a simple method represented by the manufacturing method in the present disclosure described above, and has excellent appearance and durability, maintains deep concave-convex pattern for a long time, and is flexible. Therefore, the synthetic resin skin material in the present disclosure is suitably used in various fields such as for automotive interior materials, interior parts for railroad vehicles/aircrafts, furniture, footwear such as shoes, bags, interior/exterior parts for construction, and clothing surface materials/lining.

EXAMPLES

Hereinafter, the invention will be described in detail below by way of Examples. However, the invention is not limited to these Examples. Further, the terms "part" and "%" hereinbelow are based on mass.

Example 1

Clisvon (registered trademark) NY-373 (manufactured by DIC Corporation, a polycarbonate-based polyurethane resin) was diluted with a solvent (dimethyl formamide: DMF) so that the solid content became 16%, to prepare a composition for forming a skin layer.

The obtained composition for forming a skin layer was applied to a releasing substrate, CPM5 (manufactured by LINTEC Corporation) with a knife coater in an application amount of 250 g/m$^2$ to form a skin layer having a thickness of 20 μm on the surface of the releasing substrate (process (I)).

Using Ryuron Paste (registered trademark) 630 (manufactured by Tosoh Corporation) as a polyvinyl chloride resin, a plasticizer (dialkyl phthalate) was added thereto in an amount of 90 parts with respect to 100 parts of the polyvinyl chloride resin to prepare a composition for forming a thermoplastic resin layer.

The storage elastic modulus of the polyvinyl chloride resin contained in the composition at 160° C. measured in accordance with JIS K 7244 (1998) was 400,000 Pa, and accordingly, the polyvinyl chloride resin had a preferable property according to the present disclosure.

The obtained composition for forming a thermoplastic resin layer was applied to one side of the skin layer obtained in the process (I) with a knife coater in an application amount of 75 g/m$^2$, to form a thermoplastic resin layer having a thickness of 60 μm on one side of the skin layer (process (II)).

The laminate of the skin layer and the thermoplastic resin layer obtained in the process (II) was pasted to a pre-prepared base fabric (a knitted fabric of polyester yarn (melting point: 254° C.) of 150 dtex/48f, thickness: 0.9 mm, manufactured by Hayashi Telempu Corporation, GHS001).

After that, as an optional process, a composition for forming a surface treatment layer containing a water dispersion of a urethane resin (a non-yellowing polycarbonate-based polyurethane surface treatment agent (manufactured by Stahl: WF-13-139)) was applied to the surface at the opposite side of the skin layer from the thermoplastic resin layer in an amount by which the thickness after drying became 5 μm, and was dried to form a surface treatment layer (process (VI)).

In this manner, a laminate for forming a synthetic resin skin material having a thickness of 1.0 mm and including a base fabric, a thermoplastic resin layer, a skin layer and a surface treatment layer in this order, was obtained.

The obtained laminate for forming a synthetic resin skin material was subjected to embossing.

The heater of the embossing machine was adjusted such that the surface temperature of the side of the skin layer became 150° C. Embossing was performed at a pressure of 2 kgf/cm$^2$ and a processing speed of 2 m/min. to obtain a synthetic resin skin material of Example 1 having a deep three-dimensional shape and a deep pattern (process (IV)).

Example 2

The skin material of Example 2 was obtained in the same manner as in Example 1, except that, in the embossing conditions of Example 1, the surface temperature of the skin layer was set at 100° C.

Example 3

The skin material of Example 3 was obtained in the same manner as in Example 1, except that, in the embossing conditions of Example 1, the surface temperature of the skin layer was set at 190° C.

Example 4

The skin material of Example 4 was obtained in the same manner as in Example 1, except that, in the embossing conditions of Example 1, the surface temperature of the skin layer was set at 90° C.

Comparative Example 1

The skin material of Comparative Example 1 was obtained in the same manner as in Example 1 except that the composition for forming a thermoplastic resin layer used in Example 1 was replaced with a composition for forming a thermoplastic resin layer containing Crisvon TA205FT (manufactured by DIC Corporation) as a polyurethane resin, DMF in an amount of 60 parts with respect to 100 parts of Crisvon TA205FT, BURNOCK DN950 (trade name, a crosslinking agent, manufactured by DIC Corporation), and ACCEL T81E (trade name, an accelerator, manufactured by DIC Corporation).

The storage elastic modulus of the polyurethane resin contained in the composition, measured in accordance with JIS K 7244 (1998) at 160° C., was 3,500,000 Pa.

Comparative Example 2

The skin material of Comparative Example 2 was obtained in the same manner as in Example 1 except that the composition for forming a thermoplastic resin layer used in Example 1 was replaced with a composition for forming a thermoplastic resin layer containing Crisvon TA205FT (manufactured by DIC Corporation) as a polyurethane resin, DMF in an amount of 60 parts with respect to 100 parts of Crisvon TA205FT, BURNOCK DN950 (trade name, a crosslinking agent, manufactured by DIC Corporation), and ACCEL T81E (trade name, an accelerator, manufactured by DIC Corporation), and that the surface of the skin layer was set at 190° C. during the embossing processing.

Comparative Example 3

| Composition for forming a vinyl chloride skin layer | |
| --- | --- |
| Polyvinyl chloride resin (average degree of polymerization: 1300) | 100 parts by mass |
| Plasticizer (dialkyl phthalate) | 75 parts by mass |
| Stabilizer (Ba—Zn-based composite stabilizer) | 2 parts by mass |
| Filler (Calcium bicarbonate) | 10 parts by mass |
| Colorant (pigment) | 5 parts by mass |

| Composition for forming a vinyl chloride foamed layer | |
| --- | --- |
| Polyvinyl chloride resin (average degree of polymerization: 1300) | 100 parts by mass |
| Foaming agent (ADCA) | 4 parts by mass |
| Plasticizer (dialkyl phthalate) | 75 parts by mass |
| Stabilizer (Ba—Zn-based composite stabilizer) | 2 parts by mass |
| Filler (Calcium bicarbonate) | 10 parts by mass |
| Colorant (pigment) | 2 parts by mass |

Using the above composition for forming a vinyl chloride skin layer and a layer of the composition for forming a vinyl chloride foamed layer, a laminate, in which a vinyl chloride skin layer and the layer of the composition for forming a vinyl chloride foamed layer were layered, was formed in a calendar device.

The thickness of the vinyl chloride skin layer in the laminate was 0.30 mm, and the thickness of the layer of the composition for forming a foamed layer (before foaming) was 0.65 mm.

An adhesive (manufactured by DIC Corporation, a urethane emulsion adhesive) was applied to the surface of the obtained laminate at the side of the composition for forming a foamed layer in an amount of about 10 g/m$^2$, and a base fabric was pasted thereto.

A knitted fabric with general interlocking stockinette stitching (fiber: No. 30 count blended yarn of polyester and rayon, mass per unit area: 150 g/m$^2$, thickness: 0.30 mm) was used as the base fabric.

Then, the following composition for forming a surface treatment layer was applied by gravure printing to the surface of the vinyl chloride skin layer of the laminate having the base fabric pasted thereto, and was dried at 120° C. to form a surface treatment layer having a thickness of 2.5 µm.

| Composition for forming a surface treatment layer | |
| --- | --- |
| Solvent-type polycarbonate-based polyurethane resin composition | 100 parts by mass |

The obtained laminate was passed through a heating furnace under temperature conditions of 190 to 230° C. to cause the foaming agent to foam, and a foamed resin layer containing air bubbles was formed.

Embossing was performed by pressing the embossing roller engraved with a shape of a grain pattern against the surface of the laminate in which the vinyl chloride foamed layer is formed while heating the surface of the embossing roller at 130° C., and a synthetic skin resin material of Comparative Example 3 formed with a grain pattern on the surface thereof was obtained.

Evaluation of Synthetic Resin Skin Material

Each of the obtained synthetic resin skin materials of the Examples and the Comparative Examples was evaluated according to the following criteria. The results are shown in Table 1 below.

Depth of the Concave-Convex Pattern Formed on the Skin Layer

The depth of the recesses of the concave-convex pattern formed on the synthetic resin skin material by embossing was measured by the following method.

The synthetic resin skin material was cut perpendicularly to the surface direction, and the cross section was observed with an optical microscope with a magnification of 50×. The depth of the recesses was determined by taking the arithmetic average of the measured values of the depths of the recesses measured at three points. The results are shown as "Depth of Recesses" in Table 1.

Evaluation of Appearance: Three-Dimensionality

A test sample of the obtained synthetic resin skin material was visually observed, and the state in which the shape of the embossing dye used for the embossing was transferred was evaluated based on the following criteria.

The results are shown in Table 1. In Table 1, the evaluated property is referred to as "Three-Dimensionality".

(Judgement Criteria)

The judgement criteria are as described below. In the following evaluation results, A and B indicate the levels acceptable for practical use.

A: The corner R shapes of the embossing dye are sharp at the corners of the recesses, and have been clearly transferred B: The shape of the embossing dye has been transferred, although the corner R shapes at the recesses are dulled C: The shape of the embossing dye has been hardly transferred Wear Resistance: Flat Abrasion Resistance A flat abrasion test was carried out on the obtained synthetic resin skin material at a load of 2 kg to evaluate the durability of the synthetic resin skin material based on the following criteria.

The test was carried out in view of JASO M 403/88/Flat abrasion tester for fabric materials for seat skins (method B).

For the test condition, the standard condition in the JASO method was adopted as the test condition in the present test, and the test was carried out under conditions stricter than the JASO method as follows.

Test Condition

Standard condition in the JASO method->Test condition
Pressing load: 9.81N->19.6N After the flat abrasion test, the test sample of the synthetic resin skin material was visually observed and was evaluated based on the following criteria.

Judgement Criteria:

The judgement criteria are as described below. In the following evaluation results, A and B indicate the levels acceptable for practical use.

Level Criteria for Judgement

A: The shape of the recesses are maintained even after 3000 cycles of flat abrasion B: The recesses lose shape with 2000 to less than 3000 cycles of flat abrasion C: The recesses lose shape with less than 2000 cycles of flat abrasion

REFERENCE SIGNS LIST

10, 20 Synthetic resin skin material
10A, 20A Laminate for forming a synthetic resin skin material
12 Base fabric
14 Thermoplastic resin layer
16 Skin layer containing a urethane resin (skin layer)
18 Deep recesses (recesses)
22 Adhesion layer
24 Embossing roller
26 Backup roller The entire disclosure of Japanese Patent Application No. 2019-104503, filed on Jun. 4, 2019, is incorporated herein by reference. All documents, patent applications, and technical standards described in the present disclosure are herein incorporated by reference to the same extent as if each individual document, patent application, or technical standard was specifically and individually indicated to be incorporated by reference.

The invention claimed is:

1. A synthetic resin skin material, comprising, in this order:
   a base fabric;
   a thermoplastic resin layer comprising a polyvinyl chloride resin and a plasticizer, the thermoplastic resin layer having a storage elastic modulus at 160° C. of 2,000,000 Pa or less measured in accordance with JIS K 7244 (1998); and
   a skin layer having a thickness of from 20 to 200 μm comprising a urethane resin,
   wherein the synthetic resin skin material has recesses at a side of the skin layer, the recesses having a depth, in a thickness direction of the synthetic resin skin material, that extends from the skin layer to an inner part of the base fabric, past a boundary that is present between the thermoplastic resin layer and the base fabric.

2. The synthetic resin skin material according to claim 1, wherein the polyvinyl chloride resin comprises oil-nonabsorbent polyvinyl chloride resin particles having an average particle diameter of 5 μm or less.

3. The synthetic resin skin material according to claim 1, further comprising an adhesion layer between the base fabric and the thermoplastic resin layer.

TABLE 1

|  | Layer Structure of Skin Material | | Conditions for Embossing | Evaluation Results | | |
|---|---|---|---|---|---|---|
|  | Skin Layer Resin Used (Thickness) | Thermoplastic Resin Layer Resin Used (Thickness) | Surface Temperature of Skin Material | Depth of Recesses by Embossing (μm) | Three-dimensionality | Flat Abrasion Resistance |
| Example 1 | Polyurethane (20 μm) | PVC (60 μm) | 150 | 95 | A | A |
| Example 2 |  |  | 100 | 80 | A | A |
| Example 3 |  |  | 190 | 120 | A | A |
| Example 4 |  |  | 90 | 70 | B | A |
| Comparative Example 1 | Polyurethane (20 μm) | Polyurethane (60 μm) | 150 | 40 | C | A |
| Comparative Example 2 |  |  | 190 | 50 | C | C |
| Comparative Example 3 | PVC (300 μm) | PVC (650 μm) | 130 | 110 | A | C |

From the results shown in Table 1, the synthetic resin skin materials of Examples 1 to 4 had a three-dimensional shape having deep recesses, and showed practically acceptable wear resistance in the wear resistance test under strict conditions. These results indicate that the skin materials of the Examples have both wear resistance and favorable appearance, and can be suitably used for molded bodies having complicated irregularities.

On the other hand, in Comparative Examples 1 and 2 that have a thermoplastic resin layer using a polyurethane resin having a storage elastic modulus at 160° C. of 3,500,000 Pa measured in accordance with JIS K 7244 (1998), while having a skin layer of an urethane resin, the three-dimensional shape was not sufficiently formed even when the processing temperature during the embossing was increased. In Comparative Example 3, in which a polyvinyl chloride resin was used for the skin layer in place of the urethane resin, the wear resistance was insufficient although a deep three-dimensional shape was formed.

4. The synthetic resin skin material according to claim 1, further comprising a surface treatment layer at an opposite side of the skin layer from a side of the thermoplastic resin layer.

5. The synthetic resin skin material according to claim 1, wherein the base fabric comprises a knitted fabric containing at least one fiber selected from the group consisting of a polyester fiber, a rayon fiber, a vinyl chloride fiber, a vinylidene chloride fiber, an aramid fiber, and an acrylic fiber.

6. A method for manufacturing a synthetic resin skin material, the method comprising:
- forming a skin layer containing a urethane resin using a composition for forming a skin layer containing a urethane resin;
- forming a thermoplastic resin layer having a storage elastic modulus at 160° C. of 2,000,000 Pa or less measured in accordance with JIS K 7244 (1998) by applying, to one side of the skin layer, a composition for forming the thermoplastic resin layer, the composition for forming the thermoplastic resin layer containing a polyvinyl chloride resin having a storage elastic modulus at 160° C. of 2,000,000 Pa or less measured in accordance with JIS K 7244 (1998), and a plasticizer in an amount of 35 to 120 parts by mass with respect to 100 parts by mass of the polyvinyl chloride resin, to form a laminate of the skin layer and the thermoplastic resin layer;
- adhering a base fabric to a surface of the laminate at a side of the thermoplastic resin layer; and
- bringing an embossing roller into contact with the laminate on a surface at a side of the skin layer, the laminate having the base fabric adhered thereto, to perform embossing to form recesses, wherein, in forming the recesses, recesses, having a depth, in a thickness direction of the synthetic resin skin material, that extends from the skin layer to an inner part of the base fabric, past a boundary that is present between the thermoplastic resin layer and the base fabric, are formed at the surface at the side of the skin layer of the laminate, wherein the skin layer of the synthetic resin skin material has a thickness of from 20 to 200 μm.

7. The method for manufacturing a synthetic resin skin material according to claim 6, wherein the polyvinyl chloride resin having a storage elastic modulus at 160° C. of 2,000,000 Pa or less measured in accordance with JIS K 7244 (1998) comprises oil-nonabsorbent polyvinyl chloride resin particles having an average particle diameter of 5 μm or less.

8. The method for manufacturing a synthetic resin skin material according to claim 6, further comprising forming an adhesion layer between the thermoplastic resin layer and the base fabric.

9. The method for manufacturing a synthetic resin skin material according to claim 6, wherein, in the embossing, a surface temperature of the skin layer at a side that is in contact with the embossing roller is from 90 to 210° C.

* * * * *